May 25, 1926.
O. S. KARNES, SR
1,586,154
COFFEEPOT
Filed May 8, 1925
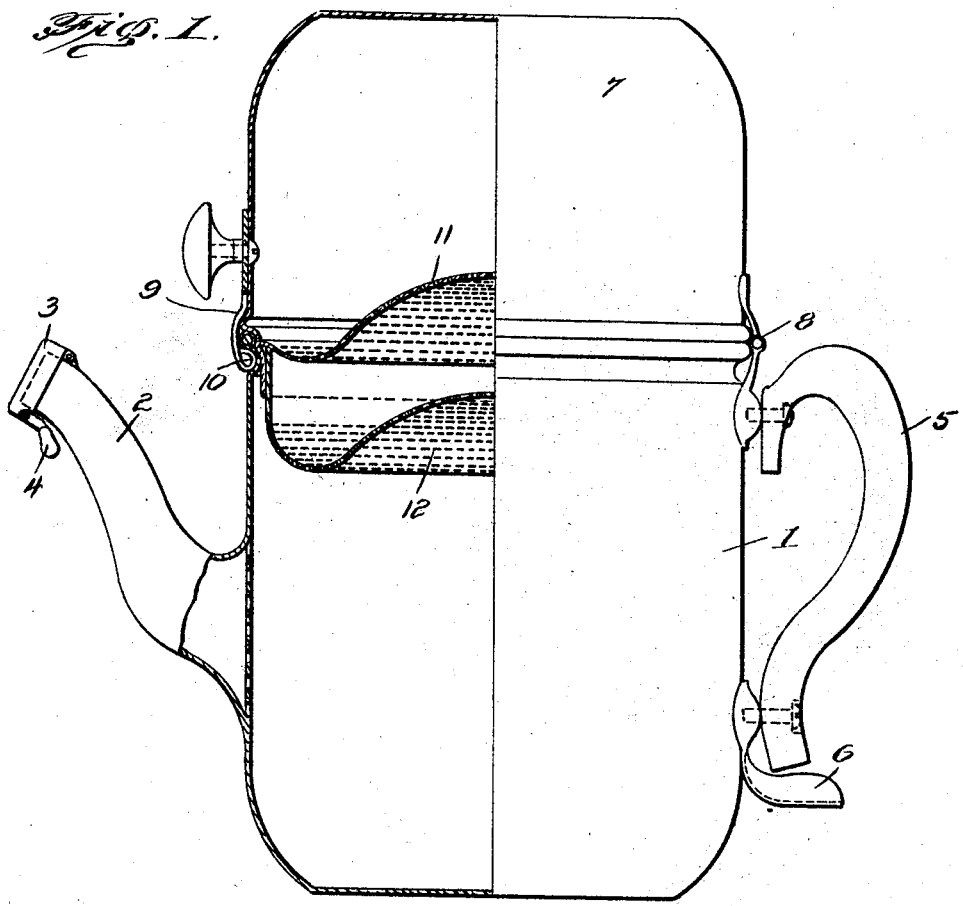
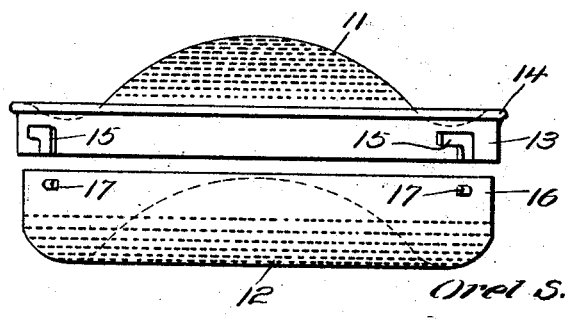
Inventor
Orel S. Karnes, Sr.
By
Attorney Patented May 25, 1926.

1,586,154

UNITED STATES PATENT OFFICE.

OREL S. KARNES, SR., OF LA GRANGE, ILLINOIS.

COFFEEPOT.

Application filed May 8, 1925. Serial No. 28,856.

The present invention relates to a coffee pot, and aims to provide a device, which will be economical in the use of the coffee obtaining the full strength therefrom.

Another important object of the invention is to provide a coffee pot of this nature, which is exceedingly simple in its construction, easy to use, inexpensive to manufacture, strong, durable, and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawing:

Figure 1 is a side elevation of the coffee pot embodying the features of my invention, showing a portion thereof in vertical section, and Figure 2 is an elevation of the coffee holder.

Referring to the drawing in detail, it will be seen that 1 designates the body of the coffee pot provided with a spout 2, having a cap 3 hinged to the end thereof, and capable of being held in a closed position by a catch member 4, or in any other suitable manner. A wooden handle 5 is fixed to the coffee pot 1, and a shield of metal or the like as at 6, is disposed to extend under the handle, so as to prevent the flame from burning the lower portion of the handle off. A relatively large inverted cup-shaped lid 7 is hingedly mounted as at 8, on the open end of the coffee pot 1, and may be held in a closed position, by a spring clip 9. The upper edge of the coffee pot is formed with an inwardly disposed annular bead 10 forming a shoulder, upon which is adapted to rest the coffee holding device. This coffee holding device includes an upper concavo-convexed inverted cup-shaped portion 11, and a similar lower portion 12. The inverted cup shaped portions 11 and 12 merge at their edges into marginal gutter portions, the gutter portion of the lower being deeper than the gutter portion of the upper. The upper portion 11 is provided with a depending annular flange 13, having a bead or annular shoulder on its upper edge as at 14, for resting on the bead or shoulder 10. This flange 13 is also provided with a plurality of bayonet slots 15. The member 12 is provided with an upwardly extending annular flange 16 adapted to be received in the flange 13, and having projected therefrom lugs 17, adapted to be received in the bayonet slots 15. The concavo-convex cup-shaped bodies of the members 11 and 12 are formed of perforated material and the coffee is adapted to be received between them and the device is mounted in the coffee pot, as is shown to advantage in Figure 1. The water is placed in the pot 1 before the holder is engaged therein. When the parts are thus assembled, the coffee pot is placed on the stove, and as the water comes to a boil, the cap 3 is closed over the spout 2 and the coffee pot is inverted, so that the boiling water may pass through the holder and the coffee therein and collect in the relatively large inverted cup-shaped lid 7. The coffee pot is then placed right side up and the cap 3 is opened. As soon as the coffee has passed through the holder and collected in the coffee pot 1 at the bottom thereof, it is ready for use. By a coffee pot of this nature, used as outlined above, it will be seen that the maximum strength may be obtained from the coffee and thus the coffee may be used economically. It will also be seen that the device is easy to manipulate, and attains all of the features of advantage enumerated as desirable in the statement of the invention and the above description. It will also be apparent that numerous changes in the details of construction, and in the combination and arrangement of parts may be resorted to, without departing from the spirit or scope of the invention as hereinafter claimed or sacrificing any of its advantages.

Having thus described my invention, what I claim as new is:

A coffee pot of the class described including, in combination, a coffee holder formed of two similar members disposed one above the other, each member including a concavo-convex inverted cup-shaped central portion and a marginal gutter portion, the gutter portion of the lower member being deeper than the gutter portion of the upper member.

In testimony whereof I affix my signature.

OREL S. KARNES, SR.